UNITED STATES PATENT OFFICE.

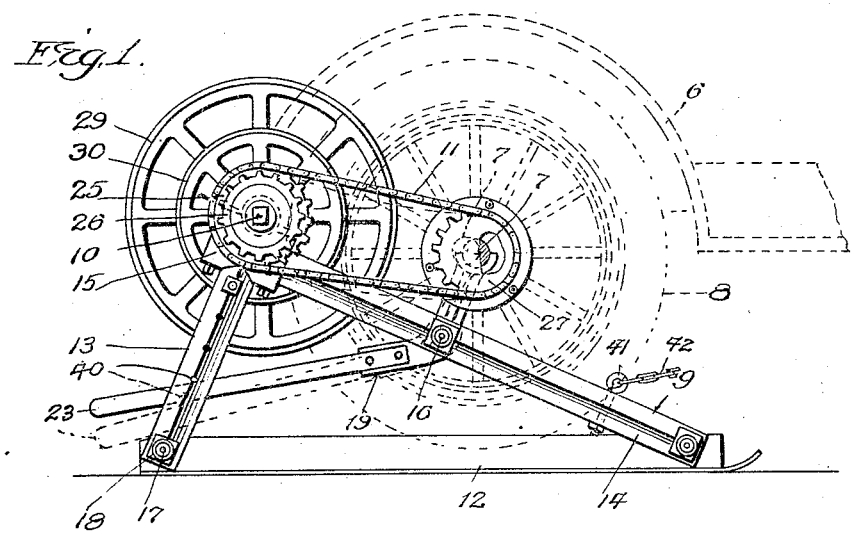
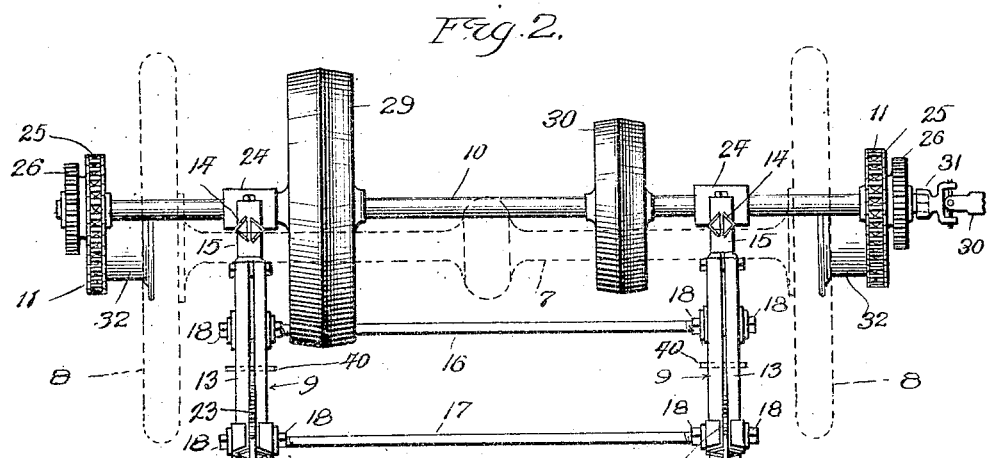
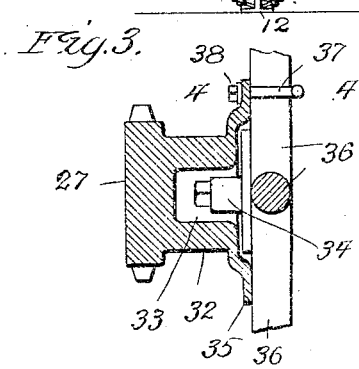 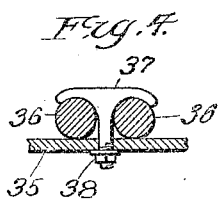 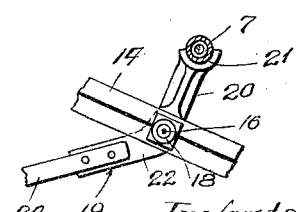

CHARLES M. STEVENSON, OF CHICAGO, ILLINOIS.

POWER ATTACHMENT FOR MOTOR-VEHICLES.

1,306,448.  Specification of Letters Patent. Patented June 10, 1919.

Application filed July 17, 1918. Serial No. 245,271.

*To all whom it may concern:*

Be it known that I, CHARLES M. STEVENSON, a citizen of the United States, and a resident of Chicago, Cook county, and State of Illinois, have invented certain new and useful Improvements in Power Attachments for Motor-Vehicles, of which the following is declared to be a full, clear, and exact description.

This invention relates to power attachments for motor vehicles and has for its object to provide a simple, practical and efficient apparatus which may be quickly and readily connected with the driving wheels of a motor vehicle and employed for transmitting power from the motor of said vehicle to any machine or implement as is desired.

The invention consists in the several novel features hereinafter fully set forth and claimed.

The invention is clearly illustrated in the accompanying drawing, in which:

Figure 1 is a side elevation of a power attachment for motor vehicles embodying a simple form of the present invention, a fragment of a motor vehicle being shown in dotted lines in connection therewith; Fig. 2 is a rear elevation of the attachment with the driving wheels and rear axle of the motor vehicle shown in dotted lines; Fig. 3, is a detail, axial section through a sprocket wheel showing the means for connecting it to a wheel; Fig. 4 is a detail section taken on the line 4—4 of Fig. 3 and Fig. 5 is a side elevation of a fragment of one of the frame bars and an axle lifting lever.

Referring to said drawing, the reference character 6, designates a fragment of an automobile or other motor vehicle, of which 7 is the rear axle and 8, the driving wheels. These parts are illustrated by dotted lines as they form no part of the present invention. The power attachment comprises a frame 9, a power transmitting shaft 10, mounted thereon and arranged to be connected to both driving wheels by sprocket chains 11. The frame 9, comprises two similar connected side frame members, each consisting of a horizontal bottom bar 12, preferably in the form of a T, iron bar, and two upwardly extending and inclined members 13, 14, bolted to the bottom bar 12, at their lower ends, and bolted to a block 15, at their upper ends, thus providing a triangular shaped side frame member. Conveniently the oblique members 13, 14, may comprise angle iron bars arranged in pairs and straddling the vertical web of the bottom bar 12. The two side frame members are spaced apart and rigidly connected together by cross rods 16, 17, having nuts 18, upon their ends for securing them to the side frame members.

Between the angle iron bars of the oblique bars 14, are lifting levers 19, which are fulcrumed on the cross rod 16, the ends of the arms 20, of said levers have semi-circular sockets 21, formed therein, which are adapted to receive the rear axle of a motor vehicle. The arms 22, of the levers have handles 23, by which the levers are manipulated and said handles project back through the space between the angle irons of the oblique bars 13, where they may be grasped by the attendant in lifting or lowering the driving wheels of the motor vehicle.

The shaft 10, is journaled in bearing boxes 24, on the blocks 15, and extends crosswise of the frame, and parallel with the rear axle of the motor vehicle when supported by the lifting levers 19. Removably secured on said shaft at each end are sprocket wheels 25, 26 either of which may be connected to a sprocket wheel 27 by the sprocket chain 11. The sprocket wheels 25 are of larger diameter than the sprocket wheels 26, to provide for more or less speed and power for the shaft 10. The sprocket wheels 25, 26 may be cast as one piece if desired and by removing them from the shaft and reversing them, greater speed, but less power may be obtained. Belt pulleys 29, 30 may be secured to the shaft 10, for transmitting power to any machine or implement which is to be driven by the attachment, and a tumbling bar 30, may be connected to the squared end of the shaft 10 by a coupling 31.

Each sprocket wheel 27 has a hub 32, which is centrally recessed as at 33, whereby it may be slipped over the hub 34 of one of the driving wheels of the motor vehicle. A flange 35, projects beyond the recessed portion of the sprocket wheel hub 32, and is arranged to bear against the outer sides of the spokes 36 of either driving wheel. T bolts 37, are provided for removably securing the sprocket wheels 27 to the spokes of the driving wheels, which T bolts are arranged to engage the rear sides of the spokes. The shanks of the T bolts extend through holes in the flanges 35 and have nuts 38, threaded upon their ends which may be screwed up to clamp the sprocket wheels 27 rigidly upon the spokes of the driving wheels.

In use the attachment is placed under the rear end of the motor vehicle, with the socket ends of the levers in their lowermost position, or the motor vehicle may be backed over the frame of the attachment to bring the axle into the sockets at the ends of the lifting levers. The handles of both levers are then depressed to the position shown in dotted lines in Fig. 1, thereby lifting the rear axle of the motor vehicle up to the position illustrated by dotted line. Pins 40, are inserted in holes in the oblique bars 13, immediately above the handles to hold the levers in such position.

The sprocket chains 11, may then be readily slipped over the sprocket wheels. It is to be understood that before or after the vehicle has been raised by the levers 19, the sprocket wheels 27 are attached to the driving wheels of the vehicle. After the sprocket chains have been placed around the sprocket wheels, the pins 40, are withdrawn and the lifting levers tilted to swing the axle forward far enough to take up the slack in the sprocket chains, after which the pins are inserted in the holes immediately above the handles of the lifting levers. The driving wheels are thereby held above the ground, and when the motor is started, power may be transferred to the shaft 10, by shifting the speed lever and throwing in the clutch of the motor. The speed of the shaft 10, and power transmitted thereto, is under the control of the attendant, who may speed up the motor as is required.

I bolts 41 may be secured to the inclined frame members 14, and a chain 42, may be secured to said I bolts whereby the entire apparatus, including the automobile may be drawn forward to tighten the belt on the driving pulley.

It is observed that by driving the shaft 10, from the spokes of both driving wheels the differential gear of the rear axle is not required to do the work required when only one driving wheel is employed to drive a power attachment, whereby wear and tear upon the differential gear is eliminated. Furthermore, the tires are left free and wear and tear upon them is eliminated. By placing the lifting levers 19, between the bars 13 and 14, they are maintained in vertical planes and any tendency for them to tilt upon the shaft 16, is eliminated.

More or less variation of the exact details of construction is possible without departing from the spirit of this invention; I desire, therefore not to limit myself to the exact form of the construction shown and described, but intend, in the following claims, to point out all of the invention disclosed herein.

I claim as new and desire to secure by Letters Patent:

1. A power attachment for motor vehicles, comprising two connected side frame members, a pair of axle lifting levers fulcrumed on said side members, a power transmitting shaft journaled on said side frame members, two sprocket wheels, one detachably secured to the spokes of each driving wheel of a motor vehicle whose axle is supported by said lifting levers, sprockets mounted on said shaft, and sprocket chains trained around alined sprocket wheels on the driving wheels and said shaft.

2. A power attachment for motor vehicles, comprising two triangular shaped side frame members, rigid connections therebetween, a pair of axle lifting levers fulcrumed upon said side frame members, means for holding said levers in their lifting position, a power transmitting shaft journaled upon said side frame members, two sprocket wheels, one adapted to be detachably secured to each driving wheel of a motor vehicle whose rear axle is supported by said levers, two sprocket wheels mounted on said shaft and two sprocket chains adapted to be trained over alined sprocket wheels on said driving wheels and said shaft.

3. A power attachment for motor vehicles comprising two connected side frame members, axle lifting means mounted thereon, a power transmitting shaft journaled on said side frame members, two sprockets adapted to be detachably secured to the driving wheels of a motor vehicle whose axle is supported by said axle lifting members, combined large and small sprocket wheels, reversibly mounted on each end of said shaft, and two sprocket chains arranged to be trained around alined sprocket wheels on said driving wheels and said shaft.

4. A power attachment for motor vehicles comprising a frame, a power transmitting shaft journaled thereon, two sprocket wheels mounted on said shaft, two sprocket wheels, one adapted to be detachably secured to each driving wheel of a motor vehicle, sprocket chains trained around alined sprocket wheels on said shaft and said driving wheels, axle lifting levers fulcrumed on said frame, and means for holding said levers in two positions, in one of which the sprocket wheels of the driving wheels are held in position to provide enough slack in said sprocket chains to permit their removal and replacement, and in the other position said sprocket wheels are held in position to take up the slack.

5. A power attachment for motor vehicles comprising a frame having two side members and cross connecting members, each side frame member comprising two pairs of oblique closely spaced bars, connected together at their upper ends, and a runner member secured to the lower ends of the bars, and axle lifting levers extending between said closely spaced bars and fulcrumed upon said side frame members.

CHARLES M. STEVENSON.

Copies of this patent may be obtained for five cents each, by addressing the "Commissioner of Patents, Washington, D. C."